(12) United States Patent
Yamamoto

(10) Patent No.: US 10,715,755 B2
(45) Date of Patent: Jul. 14, 2020

(54) SOLID-STATE IMAGE SENSOR AND IMAGING DEVICE

(71) Applicant: SONY CORPORATION, Tokyo (JP)

(72) Inventor: Atsuhiko Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 2 days.

(21) Appl. No.: 16/087,114

(22) PCT Filed: Feb. 10, 2017

(86) PCT No.: PCT/JP2017/004925
§ 371 (c)(1),
(2) Date: Sep. 21, 2018

(87) PCT Pub. No.: WO2017/169171
PCT Pub. Date: Oct. 5, 2017

(65) Prior Publication Data
US 2019/0110010 A1    Apr. 11, 2019

(30) Foreign Application Priority Data

Mar. 31, 2016  (JP) ................................. 2016-070115

(51) Int. Cl.
*H04N 5/378* (2011.01)
*H04N 5/3745* (2011.01)
*H04N 5/341* (2011.01)

(52) U.S. Cl.
CPC ............. *H04N 5/378* (2013.01); *H04N 5/341* (2013.01); *H04N 5/3745* (2013.01); *H04N 5/37455* (2013.01)

(58) Field of Classification Search
CPC .................................................... H04N 5/378

USPC ......................................................... 348/302
See application file for complete search history.

(56) References Cited

U.S. PATENT DOCUMENTS

2010/0283881 A1\* 11/2010 Araki ................ H01L 27/14643
348/308
2016/0141326 A1    5/2016 Hanzawa

FOREIGN PATENT DOCUMENTS

| CN | 105210363 A | 12/2015 |
|----|-------------|---------|
| JP | 2002-100753 A | 4/2002 |
| JP | 2012-175331 A | 9/2012 |
| JP | 2013-153511 A | 8/2013 |
| JP | 2015-177429 A | 10/2015 |

(Continued)

OTHER PUBLICATIONS

International Search Report and Written Opinion of PCT Application No. PCT/JP2017/004925, dated Apr. 25, 2017, 11 pages of ISRWO.

*Primary Examiner* — Joel W Fosselman
(74) *Attorney, Agent, or Firm* — Chip Law Group

(57) ABSTRACT

To prevent a decrease in yield due to a break in a signal line that transmits an image signal, while preventing a decrease in image quality. A solid-state image sensor includes a photoelectric conversion unit, a plurality of image signal lines, and output control units. In the solid-state image sensor, the photoelectric conversion unit generates an image signal that is a signal corresponding to incident light. In addition, the plurality of image signal lines transmit the image signal. Furthermore, the output control units are connected to the respective plurality of image signal lines and output the generated image signal to the respective plurality of image signal lines.

9 Claims, 11 Drawing Sheets

(56) References Cited

FOREIGN PATENT DOCUMENTS

| | | |
|---|---|---|
| KR | 10-2016-0132342 A | 11/2016 |
| TW | 201537983 A | 10/2015 |
| WO | 2015/141161 A1 | 9/2015 |

\* cited by examiner

SOLID-STATE IMAGE SENSOR AND IMAGING DEVICE

CROSS REFERENCE TO RELATED APPLICATIONS

This application is a U.S. National Phase of International Patent Application No. PCT/JP2017/004925 filed on Feb. 10, 2017, which claims priority benefit of Japanese Patent Application No. JP 2016-070115 filed in the Japan Patent Office on Mar. 31, 2016. Each of the above-referenced applications is hereby incorporated herein by reference in its entirety.

TECHNICAL FIELD

The present technology relates to a solid-state image sensor and an imaging device. Specifically, the present technology relates to an image sensor in which pixels are arranged in a matrix, and an imaging device.

BACKGROUND ART

Conventionally, a photoelectric conversion device in which pixels including photoelectric conversion elements that perform photoelectric conversion are arranged in a matrix has been used. In such a photoelectric conversion device, driving lines that supply a driving signal to the pixels and signal lines that read charge obtained by conversion in the photoelectric conversion elements from the pixels are arranged in a XY matrix. That is, the driving line is arranged for each row, and wired in common to the pixels arranged in each row. In addition, the signal line is arranged for each column, and wired in common to the pixels arranged in each column. In a production process of such a photoelectric conversion device, there is a problem in that a break in a signal line causes a decrease in yield of the photoelectric conversion device. Hence, a system in which a decrease in yield is prevented by arranging spare wiring and performing a repair by connecting a signal line disconnected by a break to this spare wiring and causing the signal line to transmit image signals has been proposed (for example, see Patent Literature 1).

CITATION LIST

Patent Literature

Patent Literature 1: JP 2002-100753A

DISCLOSURE OF INVENTION

Technical Problem

In the conventional technology described above, image signals are transmitted by using spare wiring. However, in this case, there is a problem in that the connection of the spare wiring causes wiring capacitance of the signal line to increase, so that image signals of a column in which a break has occurred change, and image quality decreases.

In view of such a circumstance, an object of the present technology is to prevent a decrease in yield due to a break in a signal line that transmits an image signal, while preventing a decrease in image quality.

Solution to Problem

The present technology has been made in order to solve the above problem. A first aspect of the present technology is a solid-state image sensor including: a photoelectric conversion unit configured to generate an image signal that is a signal corresponding to incident light; a plurality of image signal lines configured to transmit the image signal; and a plurality of output control units configured to be connected to the respective plurality of image signal lines and output the generated image signal to the respective plurality of image signal lines. This brings about an effect that the plurality of output control units connected to the respective plurality of image signal lines output the image signal to the respective image signal lines.

In addition, in the first aspect, a selection control unit configured to select one of the plurality of output control units on a basis of selection information that is information for selecting one of the plurality of image signal lines, and cause the selected output control unit to output the generated image signal may be further included. This brings about an effect that the plurality of output control units are selected on the basis of the selection information.

In addition, in the first aspect, a selection information retention unit configured to retain the selection information may be further included. This brings about an effect that the plurality of output control units are selected on the basis of the retained selection information.

In addition, in the first aspect, an image signal output unit configured to select one of the plurality of image signal lines, and output an image signal transmitted by the selected image signal line may be further included. This brings about an effect that the image signal line through which the image signal is transmitted is selected.

In addition, in the first aspect, an output control unit connected to the selected image signal line, among the plurality of output control units, may output the generated image signal. This brings about an effect that the selected image signal line is further selected by the image signal output unit.

In addition, in the first aspect, the plurality of output control units may simultaneously output the generated image signal to the plurality of image signal lines. This brings about an effect that the image signal is simultaneously output to the plurality of image signal lines.

In addition, in the first aspect, pixels each including the photoelectric conversion unit and the plurality of output control units may be arranged in a matrix, the plurality of image signal lines may be arranged for each column in the matrix, and the plurality of image signal lines arranged for each column may be wired in common to pixels arranged in each column. This brings about an effect that the output control units of the pixels arranged in the column are connected in common to the plurality of image signal lines arranged for each column.

In addition, in the first aspect, an image signal output unit configured to select one of the plurality of image signal lines arranged for each column for each column, and output an image signal transmitted by the selected image signal line may be further included. The plurality of output control units may simultaneously output the generated image signal to the plurality of image signal lines. This brings about an effect that one of the plurality of image signal lines arranged for each column is selected for each column.

In addition, a second aspect of the present technology is an imaging device including: a photoelectric conversion unit configured to generate an image signal that is a signal corresponding to incident light; a plurality of image signal lines configured to transmit the image signal; a plurality of output control units configured to be connected to the respective plurality of image signal lines and output the generated image signal to the respective plurality of image signal lines; and a processing circuit configured to process the transmitted image signal. This brings about an effect that the plurality of output control units connected to the respective plurality of image signal lines output the image signal to the respective image signal lines.

Advantageous Effects of Invention

According to the present technology, an excellent effect of preventing a decrease in yield due to a break in a signal line that transmits an image signal, while preventing a decrease in image quality, can be obtained. Meanwhile, the effects described herein are not necessarily limited and may be effects described in the present disclosure.

MODE(S) FOR CARRYING OUT THE INVENTION

Modes for carrying out the present technology (hereinafter referred to as embodiments) are described below. Description is given in the following order.
1. First embodiment (example in case where image signal is output to one of plurality of image signal lines)
2. Second embodiment (example in case where image signal is output to one of plurality of image signal lines, and image signal line through which image signal is transmitted is further selected)
3. Third embodiment (example in case where image signal line through which image signal is transmitted is selected)

1. First Embodiment

[Configuration of Imaging Device]

Figure 1:
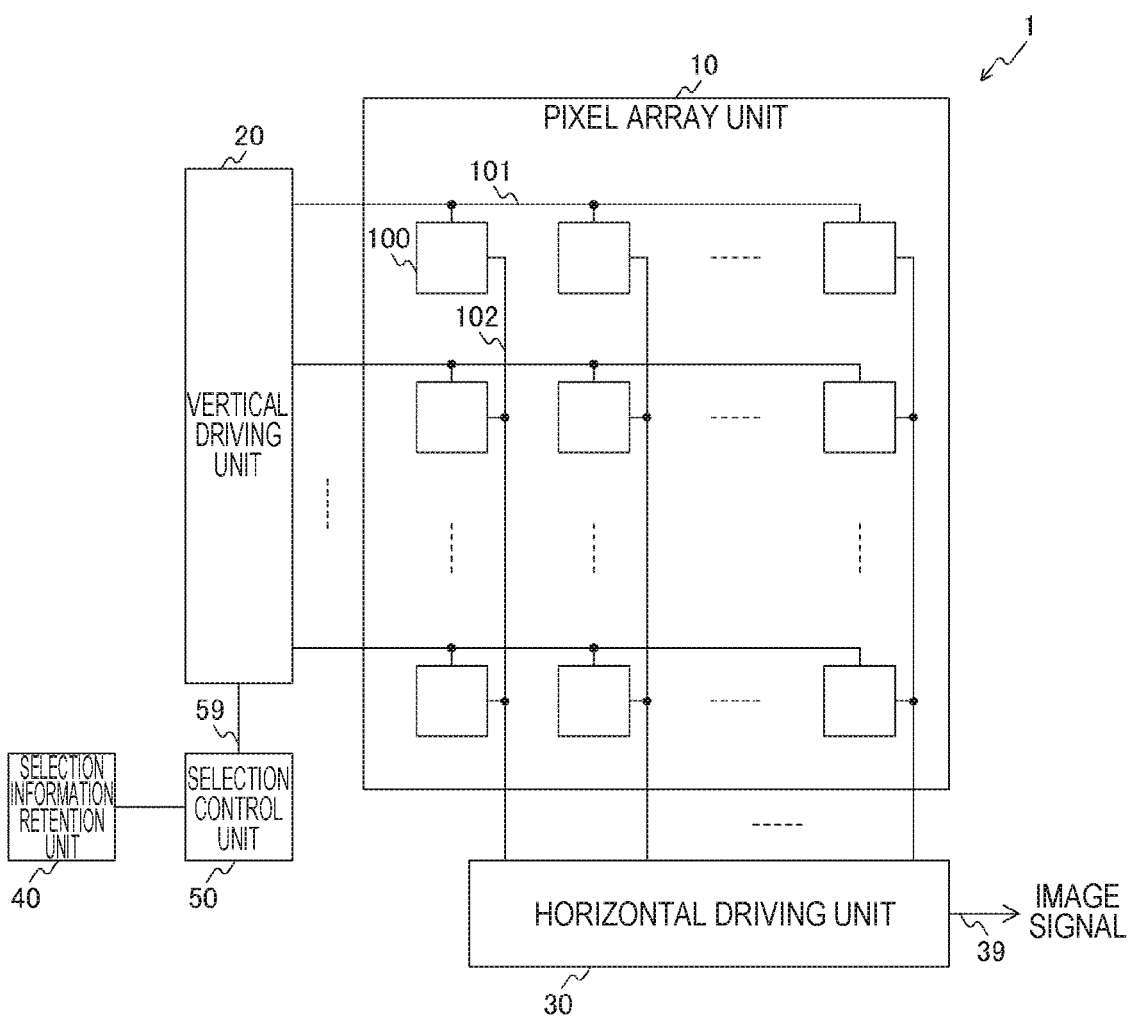
FIG. 1 illustrates a configuration example of an imaging device 1 according to a first embodiment of the present technology.

FIG. 1 illustrates a configuration example of an imaging device 1 according to a first embodiment of the present technology. The imaging device 1 includes a pixel array unit 10, a vertical driving unit 20, a horizontal driving unit 30, a selection information retention unit 40, and a selection control unit 50.

The pixel array unit 10 includes pixels 100 arranged in a matrix, the pixels 100 being configured to generate image signals, which are signals corresponding to incident light. In these pixels 100 are arranged color filters, and an image signal corresponding to incident light of a desired frequency is generated. For example, the pixel array unit 10 includes three types of pixels of a pixel that generates an image signal corresponding to red light, a pixel that generates an image signal corresponding to green light, and a pixel that generates an image signal corresponding to blue light. These pixels are arranged in the pixel array unit 10 on the basis of a predetermined rule.

In addition, in the pixel array unit 10, control signal lines 101, which are signal lines for transmitting a control signal for the pixels 100, and image signal lines 102, which are signal lines for transmitting image signals generated by the pixels 100, are arranged in a XY matrix. The control signal line 101 is wired in common to a plurality of pixels 100 arranged in one row among the pixels 100 arranged in the pixel array unit 10. In addition, the control signal line wired for each row includes a plurality of signal lines.

Meanwhile, the image signal line 102 is wired in common to a plurality of pixels 100 arranged in one column. In addition, the image signal line wired for each column includes a plurality of image signal lines. One of the plurality of image signal lines 102 for each column is selected, and an image signal generated by the pixel 100 is output. As will be described later, in the pixel 100 are arranged a plurality of output control units that are connected to the respective image signal lines 102 and output an image signal to the respective plurality of image signal lines 102. One of the plurality of output control units is selected, and the generated image signal is output to the image signal line 102. Thus, the image signal line 102 can be selected. Note that the pixel array unit 10 is an example of a solid-state image sensor in the claims.

The vertical driving unit 20 generates a control signal for the pixels 100. The vertical driving unit 20 outputs the generated control signal to the pixels 100 via the control signal lines 101. Details of a configuration of the vertical driving unit 20 are described later.

The horizontal driving unit 30 processes image signals generated by the pixels 100. The horizontal driving unit 30 processes image signals transmitted by the image signal lines 102, and outputs processed image signals to a signal line 39. These processed image signals correspond to output image signals of the imaging device 1. Details of a configuration of the horizontal driving unit 30 are described later.

The selection information retention unit 40 retains selection information. Here, selection information is information for selecting one of the image signal lines 102 described above.

The selection control unit 50 performs control of selecting one of the plurality of output control units described above, on the basis of selection information retained by the selection information retention unit 40.

[Configuration of Pixel]

Figure 2:
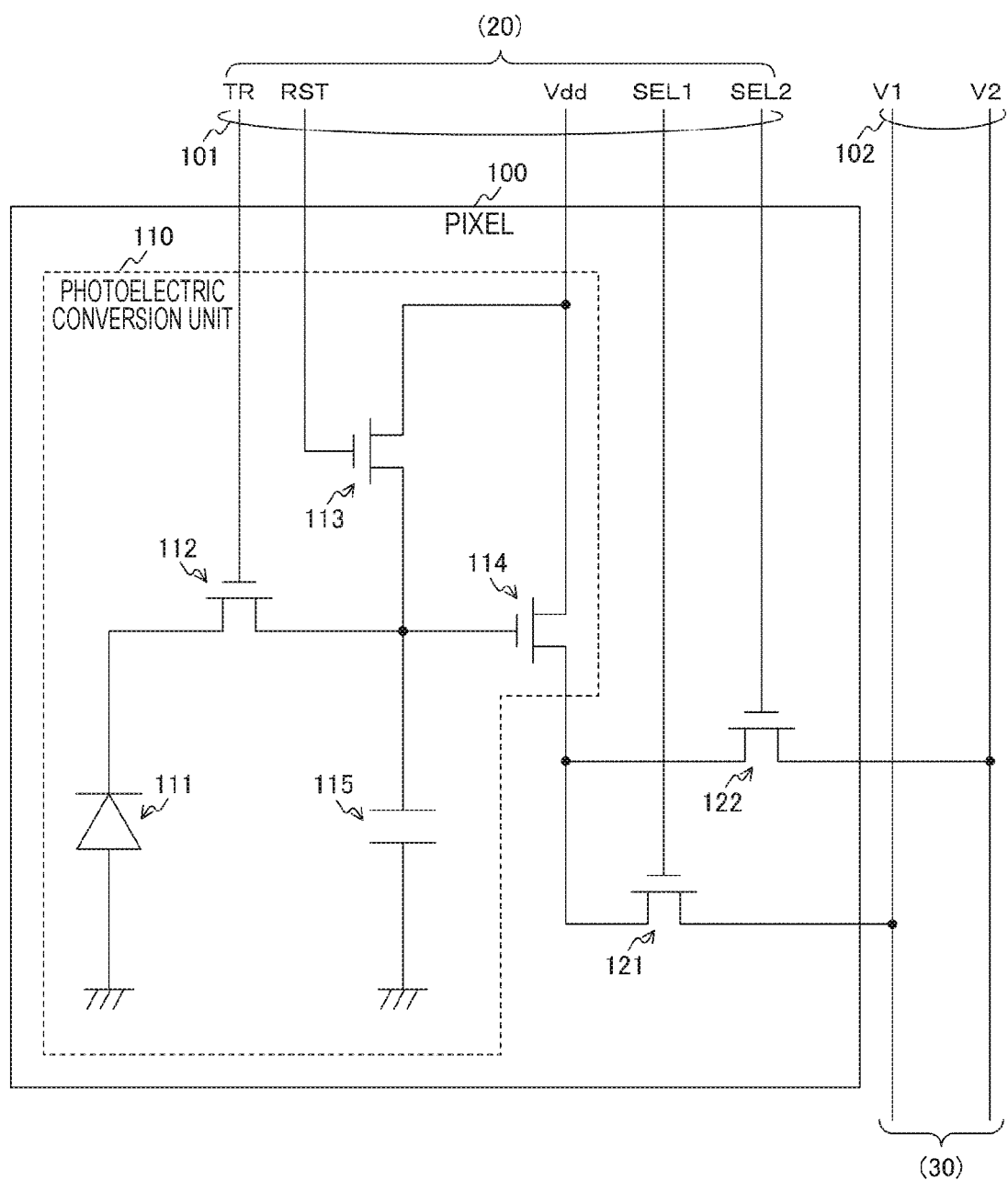
FIG. 2 illustrates a configuration example of a pixel 100 according to the first embodiment of the present technology.

FIG. 2 illustrates a configuration example of the pixel 100 according to the first embodiment of the present technology. The pixel 100 includes a photoelectric conversion unit 110, and output control units 121 and 122. In addition, the control signal line 101 and the image signal line 102 are wired to the pixel 100.

The control signal line 101 includes a plurality of signal lines and a power supply line (TR, RST, Vdd, SEL1, and SEL2), and transmits a control signal etc. to the pixel 100. The image signal line 102 includes a plurality of image signal lines (V1 and V2), and transmits an image signal generated by the pixel 100 to the horizontal driving unit 30.

The photoelectric conversion unit 110 generates an image signal. The photoelectric conversion unit 110 includes a photoelectric conversion element 111, MOS transistors 112 to 114, and a charge retention unit 115. N-channel MOS transistors can be used as the MOS transistors 112 to 114. In addition, a plurality of signal lines (TR and RST) and the power supply line (Vdd) are wired to the photoelectric conversion unit 110. The transfer signal line Transfer (TR) is a signal line that transmits a control signal to the MOS transistor 112. The reset signal line Reset (RST) is a signal line that transmits a control signal to the MOS transistor 113. These signal lines are connected to the gates of the MOS transistors. When a voltage (hereinafter, referred to as an on signal) equal to or greater than a threshold voltage between the gate and the source is input through these signal lines, the corresponding MOS transistors enter a conduction state.

The output control units 121 and 122 are connected respectively to the image signal lines V1 and V2, and output an image signal generated by the photoelectric conversion unit 110 respectively to the image signal lines V1 and V2. N-channel MOS transistors can be used as the output control units 121 and 122. In addition, the signal lines (SEL1 and SEL2) are wired respectively to the output control units 121 and 122. The selection signal lines Select1 (SEL1) and Select2 (SEL2) are signal lines that transmit a control signal respectively to the output control units 121 and 122.

The anode of the photoelectric conversion element 111 is grounded, and the cathode is connected to the source of the MOS transistor 112. The gate of the MOS transistor 112 is connected to the transfer signal line TR, and the drain is connected to the source of the MOS transistor 113, the gate of the MOS transistor 114, and one end of the charge retention unit 115. The other end of the charge retention unit 115 is grounded. The gate of the MOS transistor 113 is connected to the reset signal line RST, and the drain is connected to the power supply line Vdd. The drain of the MOS transistor 114 is connected to the power supply line Vdd, and the source is connected to the drains of the output control units 121 and 122. The gate of the output control unit 121 is connected to the selection signal line SEL1, and the source is connected to the image signal line V1. The gate of the output control unit 122 is connected to the selection signal line SEL2, and the source is connected to the image signal line V2.

The photoelectric conversion element 111 is an element that generates charge corresponding to an amount of applied light by photoelectric conversion. The generated charge is retained inside the photoelectric conversion element 111. A photodiode can be used as the photoelectric conversion element 111.

The MOS transistor 112 transfers the charge generated by the photoelectric conversion element 111 to the charge retention unit 115. The MOS transistor 112 transfers the charge by establishing conduction between the photoelectric conversion element 111 and the charge retention unit 115.

The charge retention unit 115 retains the charge transferred by the MOS transistor 112. A floating diffusion region formed in a diffusion layer of a semiconductor substrate can be used as the charge retention unit 115. The charge retention unit 115 also serves as charge-voltage conversion means. That is, since the charge retention unit 115 is stray capacitance, a voltage of one electrode on the non-grounded side of two electrodes included in the charge retention unit is a voltage corresponding to an amount of charge retained by the charge retention unit.

The MOS transistor 113 discharges the charge retained in the photoelectric conversion element 111 and by the charge retention unit 115. The charge retained in the photoelectric conversion element 111 and by the charge retention unit 115 is discharged by establishing conduction between the MOS transistor 113 and the MOS transistor 112.

The MOS transistor 114 amplifies a voltage of the charge retention unit 115 serving as charge-voltage conversion means. A signal generated by the MOS transistor 114 corresponds to an image signal generated by the photoelectric conversion unit 110.

Note that the transfer signal line TR, the reset signal line RST, and the power supply line Vdd of the control signal line 101 are wired in common to all the pixels 100 arranged in the pixel array unit 10. Meanwhile, the selection signal lines SEL1 and SEL2 are wired for each row of the pixels 100 arranged in the pixel array unit 10.

[Generation of Image Signal]

Light is applied to the photoelectric conversion element 111 in a predetermined exposure period, and charge generated by photoelectric conversion is retained in the photoelectric conversion element 111. After elapse of the exposure period, an on signal is input from the reset signal line RST to bring the MOS transistor 113 into a conduction state. Thus, the charge having been retained by the charge retention unit 115 is discharged. Next, an on signal is input from the transfer signal line TR to bring the MOS transistor 112 in a conduction state. Thus, the charge retained by the photoelectric conversion element 111 is transferred to the charge retention unit 115 to be retained. At this time, a signal based on the charge retained by the charge retention unit 115 is generated by the MOS transistor 114. These operations are executed simultaneously on all the pixels 100 arranged in the pixel array unit 10.

Next, an on signal is input to one of the selection signal lines SEL1 and SEL2, and the output control unit 121 or 122 to which the on signal is input enters a conduction state. Thus, the signal generated by the MOS transistor 114 is output to one of the image signal lines V1 and V2 as an image signal. The output of the image signal is executed sequentially for each row of the pixels 100 arranged in the pixel array unit 10.

[Configuration of Vertical Driving Unit]

Figure 3:
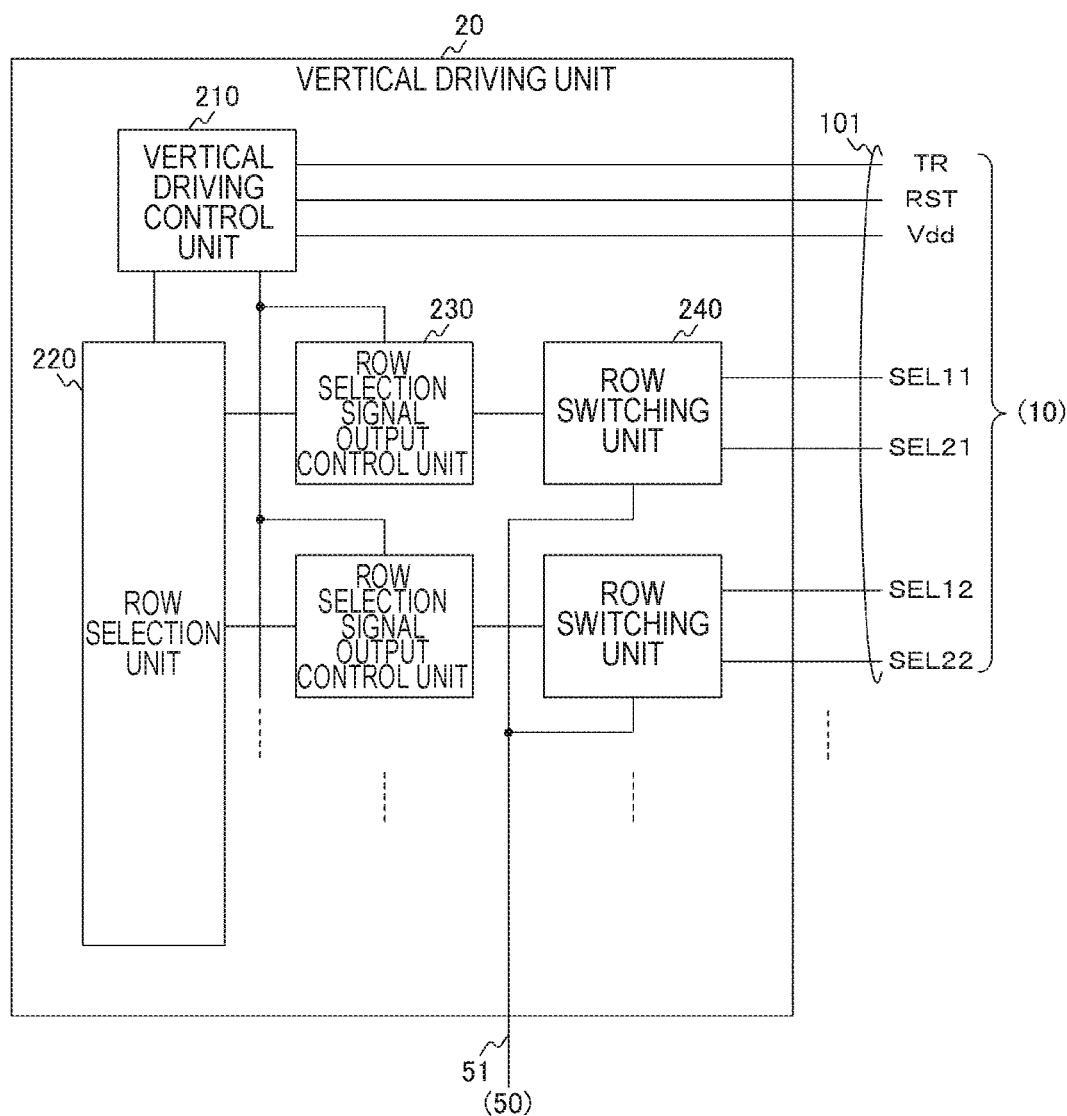
FIG. 3 illustrates a configuration example of a vertical driving unit 20 according to the first embodiment of the present technology.

FIG. 3 illustrates a configuration example of the vertical driving unit 20 according to the first embodiment of the present technology. The vertical driving unit 20 includes a vertical driving control unit 210, a row selection unit 220, a row selection signal output control unit 230, and a row switching unit 240. Note that the row selection signal output control unit 230 and the row switching unit 240 are arranged for each row of the pixels 100 arranged in the pixel array unit 10.

The vertical driving control unit 210 controls the entire vertical driving unit. In addition, the vertical driving control unit 210 generates a control signal, and outputs the control signal to the transfer signal line TR and the reset signal line RST. In addition, the vertical driving control unit 210 supplies power to the pixels 100 via the power supply line Vdd.

The row selection unit 220 generates a row selection signal for sequentially selecting rows of the pixels 100 arranged in the pixel array unit 10. The row selection unit 220 can include a shift register.

The row selection signal output control unit 230 outputs the row selection signal generated by the row selection unit 220 to the selection signal line SEL1 or SEL2. The output of the selection signal is performed under the control of the vertical driving control unit 210.

Note that the selection signal lines SEL1 and SEL2 are wired for each row. To distinguish between them, a number indicating a row is added at a tail in the drawing. For example, SEL11 and SEL21 respectively indicate the selection signal lines SEL1 and SEL2 wired in a first row. Similarly, SEL12 and SEL22 respectively indicate the selection signal lines SEL1 and SEL2 wired in a second row.

The row switching unit 240 selects one of the selection signal lines SEL1 and SEL2, and outputs the row selection signal output by the row selection signal output control unit 230 to the selected one. This selection is performed under the control of the selection control unit 50. The output row selection signal corresponds to an on signal to be input to the output control units 121 and 122 described in FIG. 2.

[Configuration of Horizontal Driving Unit]

Figure 4:
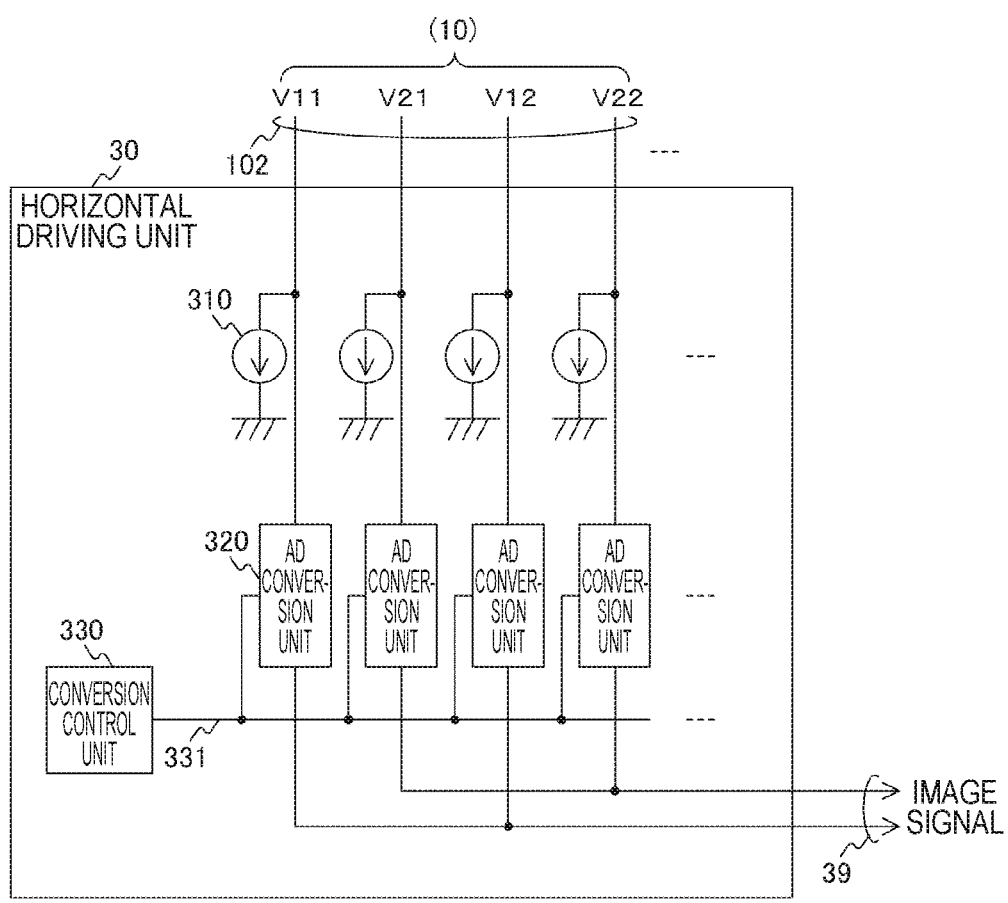
FIG. 4 illustrates a configuration example of a horizontal driving unit 30 according to the first embodiment of the present technology.

FIG. 4 illustrates a configuration example of the horizontal driving unit 30 according to the first embodiment of the present technology. The horizontal driving unit 30 includes a constant-current power supply 310, an analog-to-digital conversion unit (AD conversion unit) 320, and a conversion control unit 330. Note that the constant-current power supply 310 and the analog-to-digital conversion unit 320 are arranged for each image signal line 102.

Note that the image signal lines V1 and V2 described in FIG. 2 are wired for each column. To distinguish between them, a number indicating a column is added at a tail in the drawing. For example, V11 and V21 respectively indicate the image signal lines V1 and V2 wired in a first column. Similarly, V12 and V22 respectively indicate the image signal lines V1 and V2 wired in a second column.

The constant-current power supply 310 is a constant-current power supply that constitutes a load of the MOS transistor 114 described in FIG. 2. The constant-current power supply 310 is connected between the image signal line 102 and the ground.

The analog-to-digital conversion unit 320 performs analog-to-digital conversion on the image signal generated by the pixel 100 to process the image signal. The converted digital image signal is output to the signal line 39 sequentially from the analog-to-digital conversion unit 320 arranged at the left end in the drawing, and horizontal transfer of digital image signals is performed. Note that in the drawing, an output of the analog-to-digital conversion unit 320 connected to the image signal line V1 (V11 and V12) and an output of the analog-to-digital conversion unit 320 connected to the image signal line V2 (V21 and V22) are connected to different signal lines 39. As will be described later, the image signal from the pixel 100 is output to one of the image signal lines V1 and V2; thus, the image signal after the analog-to-digital conversion is output to one of two signal lines of the signal line 39. Note that the analog-to-digital conversion unit 320 is an example of a processing circuit in the claims.

The conversion control unit 330 controls analog-to-digital conversion and output of the converted digital image signal by the analog-to-digital conversion unit 320.

[Selection of Image Signal Line]

Figure 5:
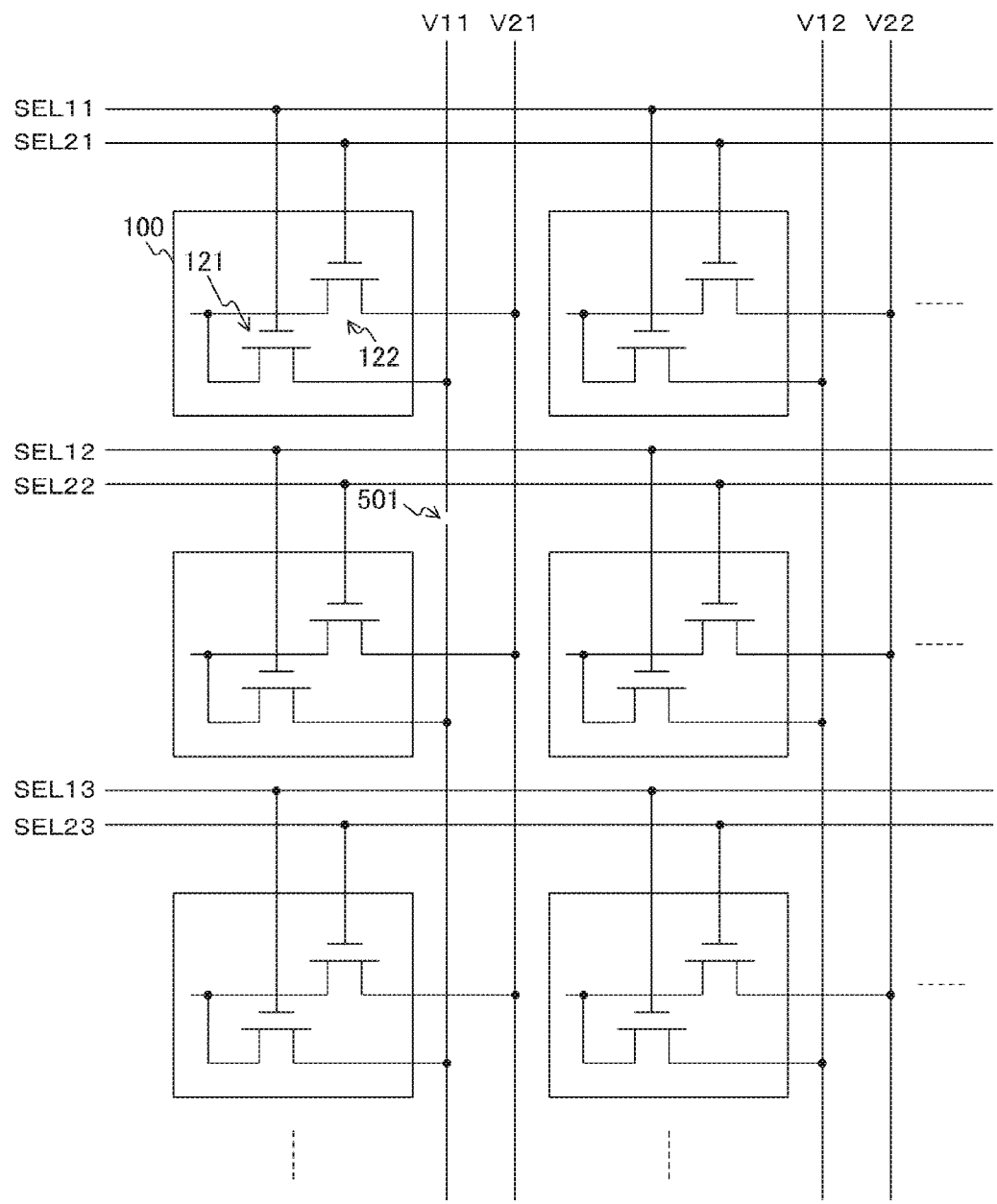
FIG. 5 illustrates an example of selection of an image signal line 102 according to the first embodiment of the present technology.

FIG. 5 illustrates an example of selection of the image signal line 102 according to the first embodiment of the present technology. The drawing illustrates an example in which in the case where a break occurs in part of the image signal line 102, a repair is made by selecting another image signal line 102. In addition, the drawing illustrates part of the pixel array unit 10, and shows six pixels 100, signal lines, and the like arranged in from the first row and the first column to the third row and the second column. For convenience, only the output control units 121 and 122 are shown in the pixel 100 in the drawing.

In an initial state, the row switching unit 240 described in FIG. 3 selects the selection signal line SEL1 and outputs a row selection signal. In the drawing, the row selection signal is output to SEL11, SEL12, and SEL13. Thus, the output control unit 121 outputs an image signal to the image signal line V1. In the drawing, image signals are output to the image signal lines V11 and V12.

Here, a case where a break occurs in the image signal line V11 is assumed. For example, in the case where a break 501 occurs in the drawing, image signals of the pixels 100 connected to the image signal line V11 disconnected by the break 501 cannot be transmitted to the horizontal driving unit 30. Hence, the image signals are transmitted using the image signal line V21. Specifically, the row switching unit 240 is caused to select the selection signal line SEL2 (SEL21, SEL22, and SEL23); thus, the output control unit 122 outputs the image signal to the image signal line V2 (V21 and V22).

As described above, the break 501 can be repaired by switching between the output control units 121 and 122. In addition, the output control units 121 and 122 are connected respectively to the signal lines V11 and V21, and an image signal is output by one of these. Therefore, capacitance of signal lines in the pixel 100 does not change between before and after the switching described above, and magnitude of the image signal transmitted to the horizontal driving unit 30 also does not change. Thus, fluctuation of image signals due to repair of the break 501 does not occur, which can prevent a decrease in image quality.

Switching of the selection signal line by the row switching unit 240 can be performed by changing selection information retained by the selection information retention unit 40. Selection information in the first embodiment of the present technology is information indicating to which of the selection signal lines SEL1 and SEL2 the selection signal is to be output by the row switching unit 240, and corresponds to information indicating the location of a break.

A break can be repaired in an inspection process etc. when the imaging device 1 is produced. For example, in the case where an abnormality due to a break is recognized in image signals output from the imaging device 1, the break can be repaired by changing selection information retained by the selection information retention unit 40. Note that in the case where selection information is changed, a signal line corresponding to the selected output control unit 121 or 122, among a plurality of signals included in the signal line 39 described in FIG. 4, needs to be used. That is, the signal line to which the image signal is output needs to be used.

Thus, in the first embodiment of the present technology, one of the output control units 121 and 122 is selected, and an image signal is output to the image signal line V1 or V2. In the case where a break occurs in an image signal line, a repair is performed by selecting the output control unit 121 or 122 connected to an image signal line on the side without the break. At this time, load capacitance of the MOS transistor 114 and the output control units 121 and 122 that output an image signal to image signal lines does not change, which can prevent a change in image signal due to the repair, and prevent a decrease in image quality.

2. Second Embodiment

In the first embodiment described above, all the image signal lines 102 are connected to analog-to-digital conversion units in the horizontal driving unit 30. In contrast, in a second embodiment of the present technology, an image signal line through which an image signal is transmitted is selected and analog-to-digital conversion is performed. This can simplify the configuration of the horizontal driving unit 30.

[Configuration of Imaging Device]

Figure 6:
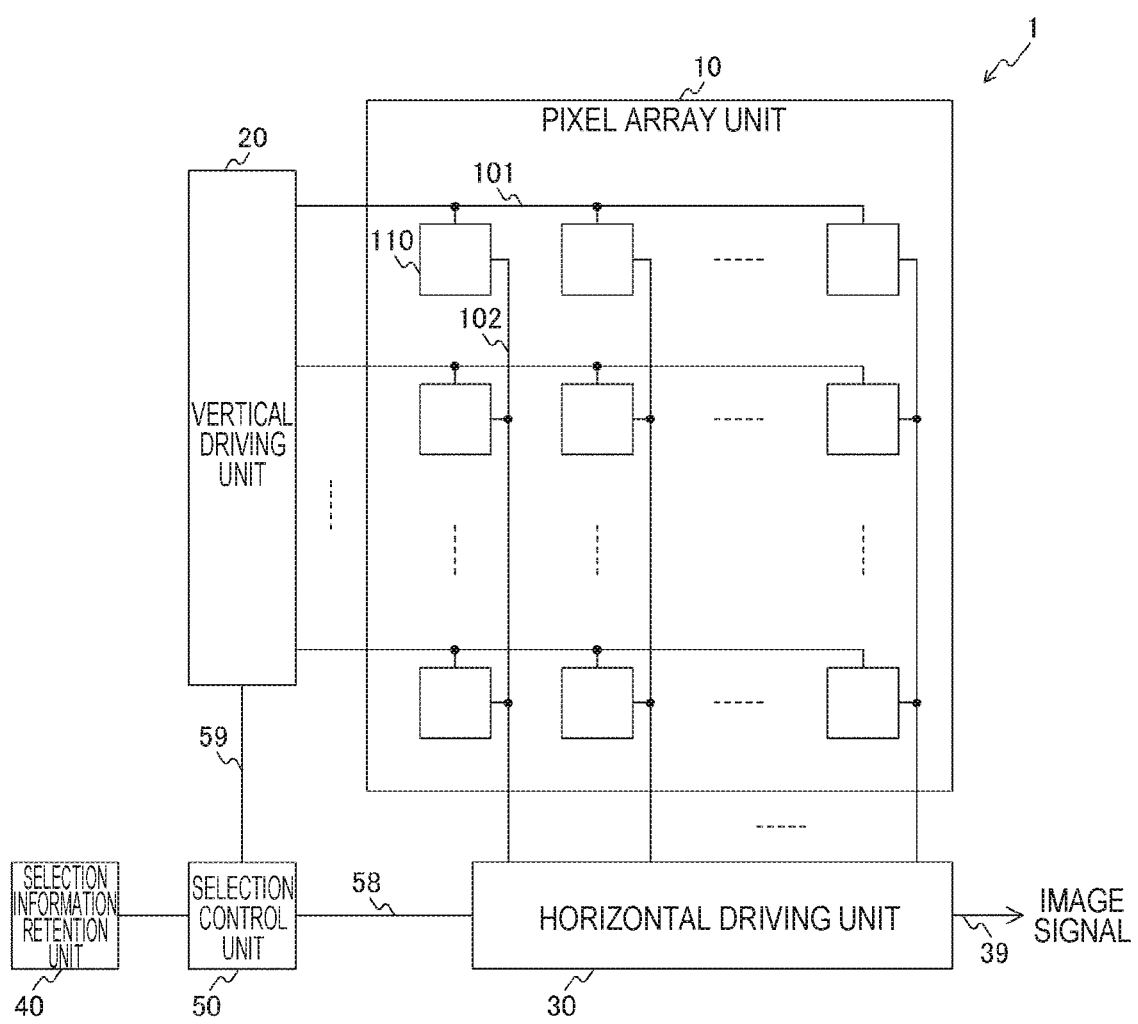
FIG. 6 illustrates a configuration example of the imaging device 1 according to a second embodiment of the present technology.

FIG. 6 illustrates a configuration example of the imaging device 1 according to the second embodiment of the present technology. The imaging device 1 in the drawing differs from the imaging device 1 described in FIG. 1 in that output of the selection control unit 50 is further input to the horizontal driving unit 30.

[Configuration of Horizontal Driving Unit]

Figure 7:
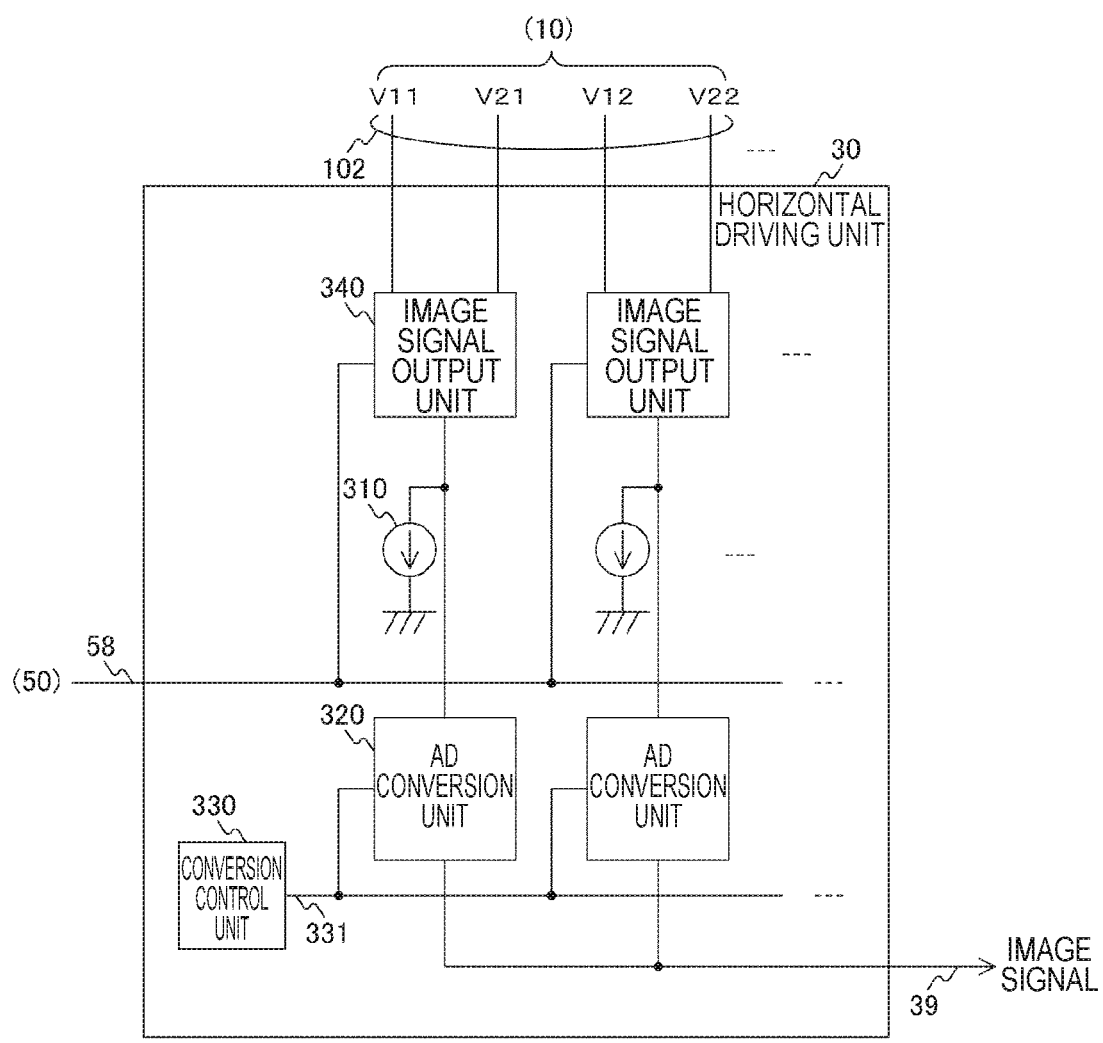
FIG. 7 illustrates a configuration example of the horizontal driving unit 30 according to the second embodiment of the present technology.

FIG. 7 illustrates a configuration example of the horizontal driving unit 30 according to the second embodiment of the present technology. The horizontal driving unit 30 in the drawing differs from the horizontal driving unit 30 described in FIG. 4 in that an image signal output unit 340 is further included. The image signal output unit 340 is arranged for each column of the pixels 100 arranged in the pixel array unit 10, and the analog-to-digital conversion unit 320 and the constant-current power supply 310 are connected to an output of the image signal output unit 340. Therefore, as compared with the horizontal driving unit 30 described in FIG. 4, the number of the constant-current power supplies 310 and the analog-to-digital conversion units 320 can be halved. In addition, a control signal from the selection control unit 50 is input to the image signal output unit 340 via a signal line 58.

The image signal output unit 340 selects one of the image signal lines V1 and V2, and outputs an image signal transmitted by the selected image signal line. The selection of the image signal line can be performed on the basis of selection information retained by the selection information retention unit 40. As mentioned above, an image signal from the pixel 100 is output to one of the image signal lines V1 and V2. Therefore, the image signal line to which the image signal is output is selected by the image signal output unit 340, and the image signal transmitted by the selected image signal line is output; thus, the number of the analog-to-digital conversion units 320 etc. can be reduced.

[Selection of Image Signal Line]

Figure 8:
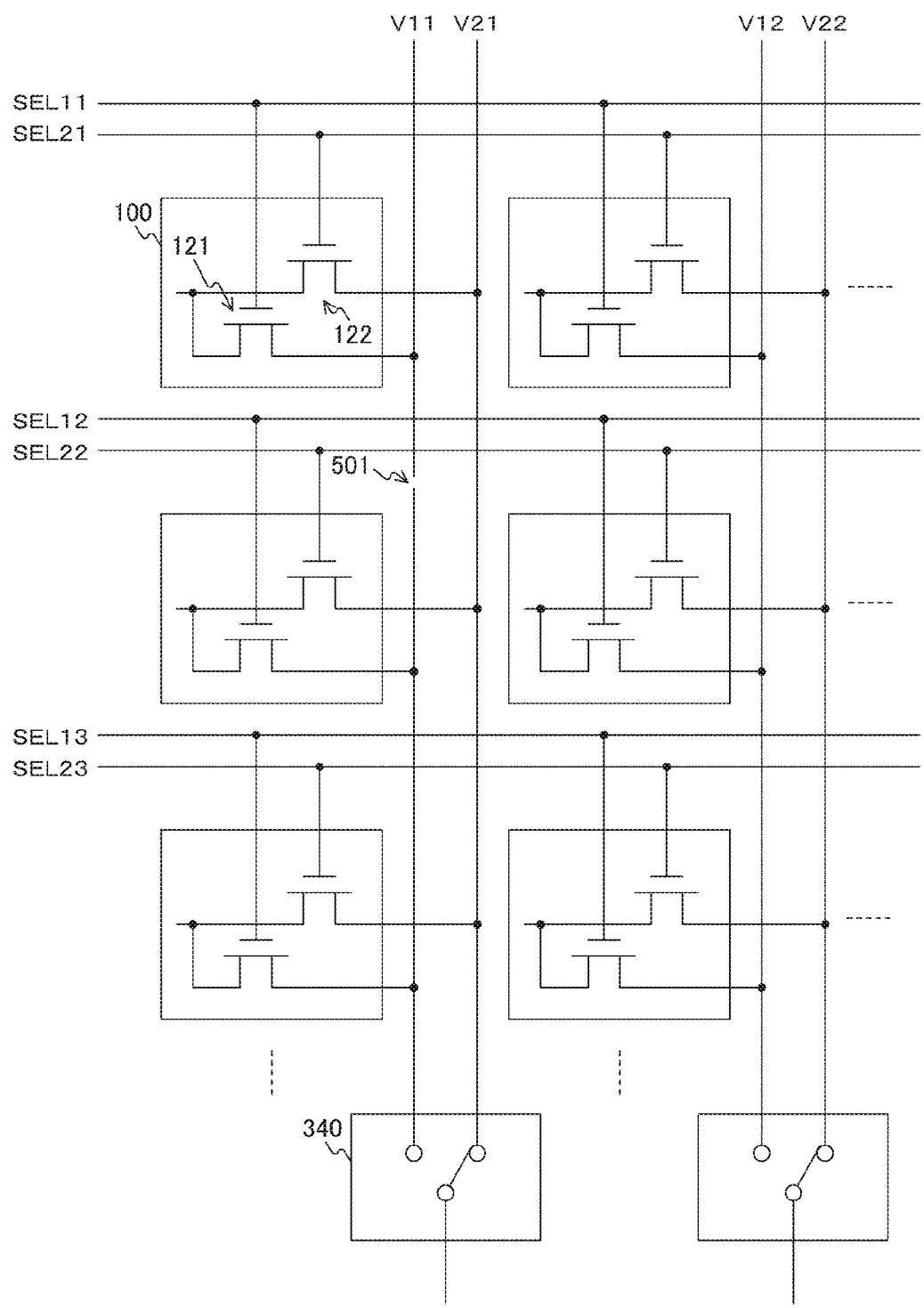
FIG. 8 illustrates an example of selection of the image signal line 102 according to the second embodiment of the present technology.

FIG. 8 illustrates an example of selection of the image signal line 102 according to the second embodiment of the present technology. As described in FIG. 5, in an initial state, the output control unit 121 is selected and an image signal is output to the image signal line V1 (V11 and V12). Therefore, the image signal output unit 340 selects the image signal line V1 (V11 and V12). In the case where the output control unit 122 is selected in the repair of the break 501, the image signal output unit 340 selects the image signal line V2 (V21 and V22) as illustrated in the drawing.

Except for this, the configuration of the imaging device 1 is similar to the configuration of the imaging device 1 described in the first embodiment of the present technology; thus, description is omitted.

Thus, according to the second embodiment of the present technology, the image signal output unit 340 selects an image signal line through which an image signal is transmitted, and outputs the image signal, which can reduce the number of the analog-to-digital conversion units 320 etc. of the horizontal driving unit 30. This can simplify the configuration of the horizontal driving unit 30.

3. Third Embodiment

In the second embodiment described above, one of the output control units 121 and 122 of the pixel 100 outputs an image signal. In contrast, in a third embodiment of the present technology, the output control units 121 and 122 output an image signal simultaneously. This can simplify the configuration of the vertical driving unit 20.

[Configuration of Pixel]

Figure 9:
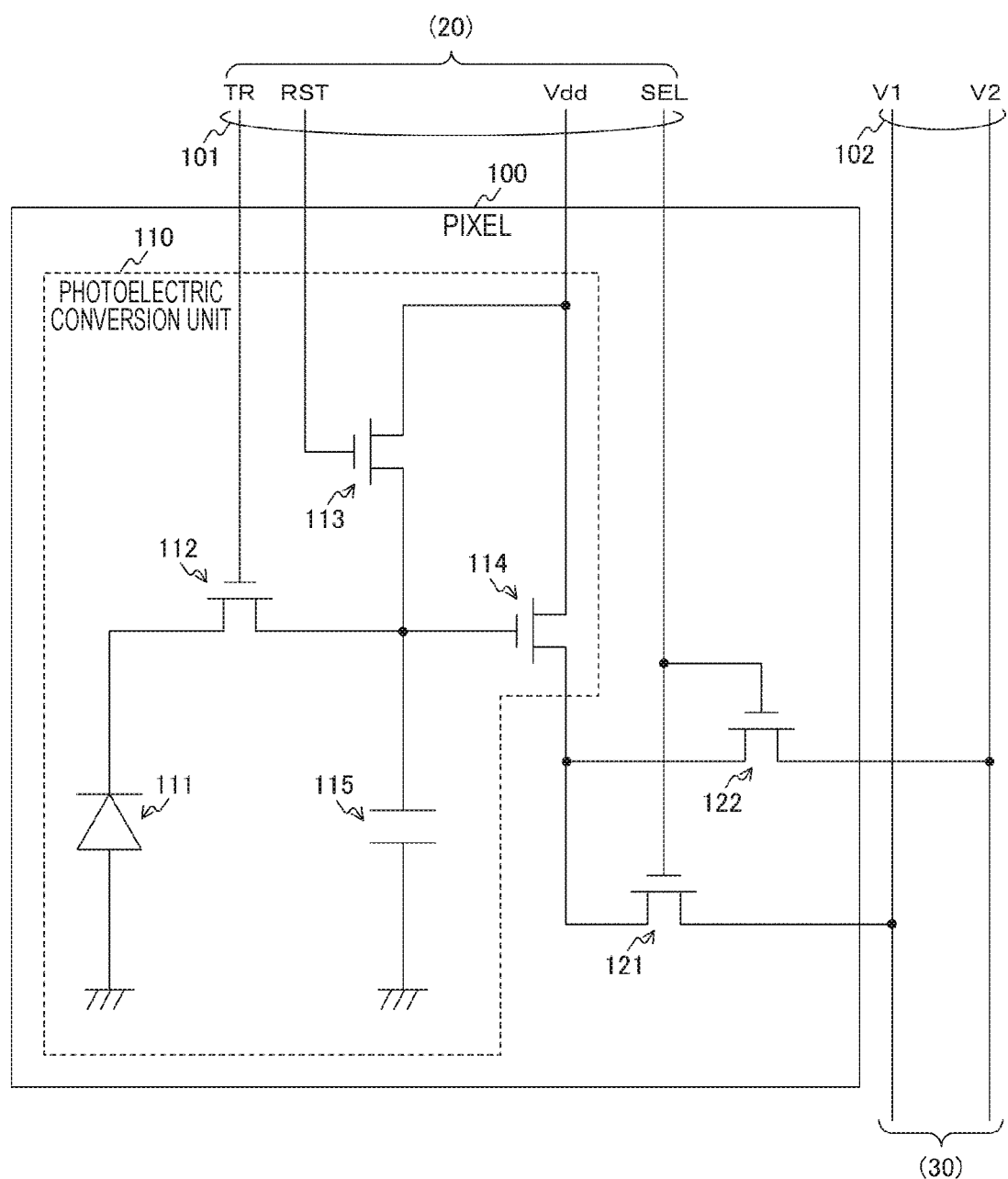
FIG. 9 illustrates a configuration example of the pixel 100 according to the third embodiment of the present technology.

FIG. 9 illustrates a configuration example of the pixel 100 according to the third embodiment of the present technology. The pixel 100 in the drawing differs from the pixel 100 described in FIG. 2 in that the gates of the output control units 121 and 122 are connected to a common selection signal line SEL.

[Configuration of Vertical Driving Unit]

Figure 10:
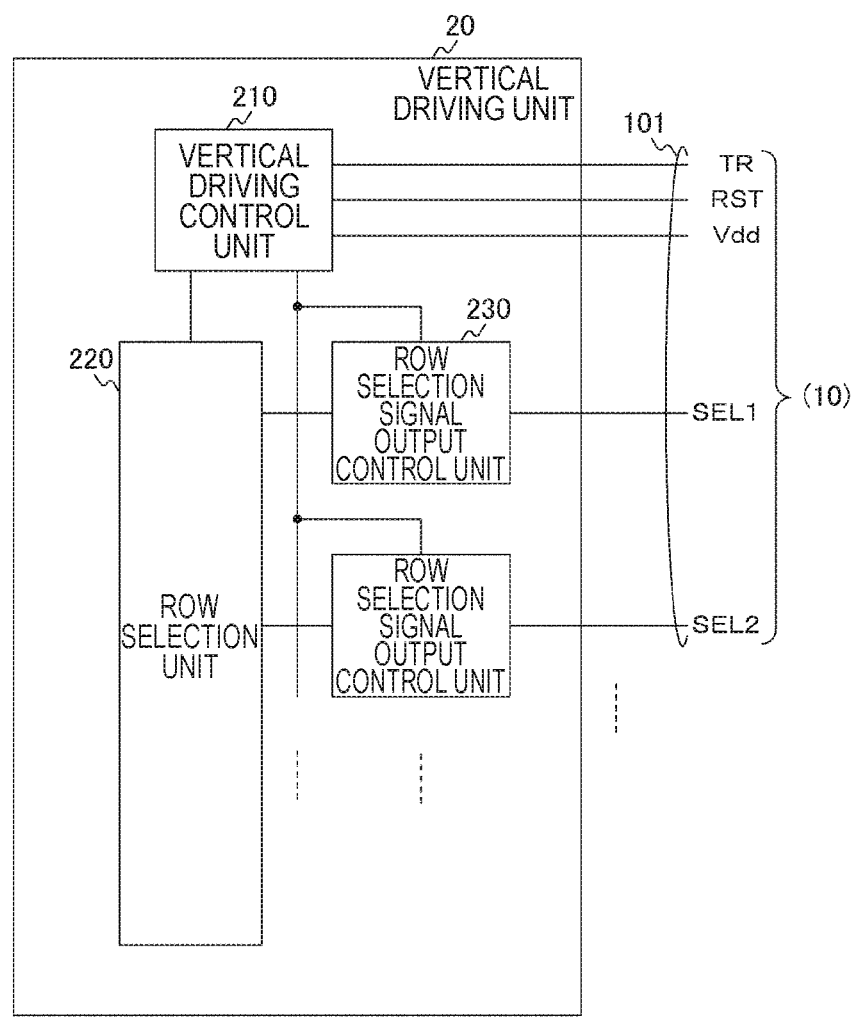
FIG. 10 illustrates a configuration example of the vertical driving unit 20 according to the third embodiment of the present technology.

FIG. 10 illustrates a configuration example of the vertical driving unit 20 according to the third embodiment of the present technology. As compared with the vertical driving unit 20 described in FIG. 3, the vertical driving unit 20 in the drawing need not include the row switching unit 240. In addition, the selection signal line SEL is wired for each row of the pixels 100 arranged in the pixel array unit 10.

[Selection of Image Signal Line]

Figure 11:
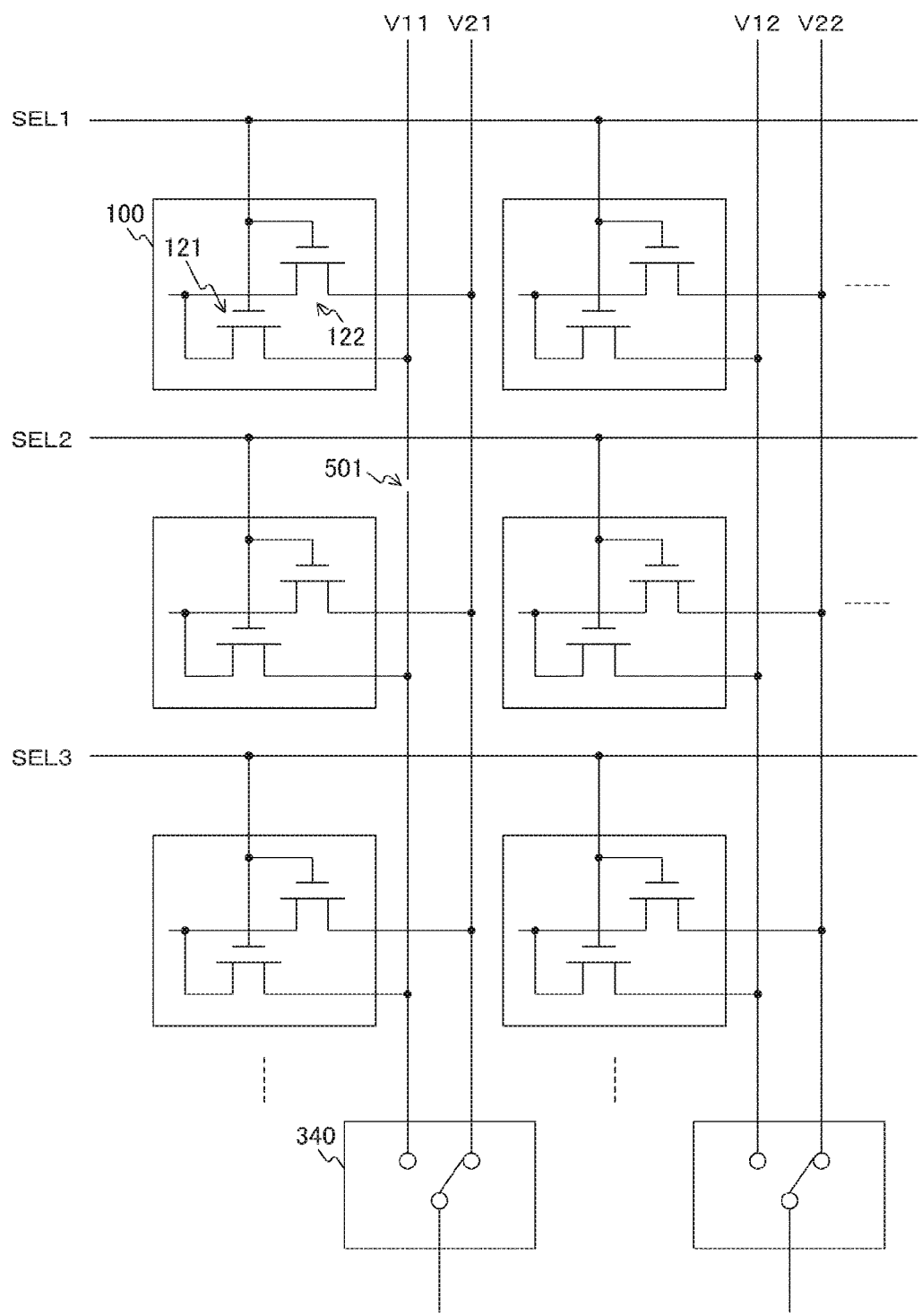
FIG. 11 illustrates an example of selection of the image signal line 102 according to the third embodiment of the present technology.

FIG. 11 illustrates an example of selection of the image signal line 102 according to the third embodiment of the present technology. In the third embodiment of the present technology, a row selection signal (on signal) is input to the output control units 121 and 122 by the selection signal line SEL arranged for each row. Therefore, the output control units 121 and 122 simultaneously output an image signal to the image signal lines V1 and V2. In an initial state, the image signal output unit 340 selects the image signal line V1 (V11 and V12). In the case where the break 501 occurs, the image signal output unit 340 selects the image signal line V2 (V21 and V22). Thus, the break 501 can be repaired.

Thus, according to the third embodiment of the present technology, the output control units 121 and 122 simultaneously output an image signal to the image signal lines V1 and V2; thus, the row switching unit 240 of the vertical driving unit 20 can be omitted. This can simplify the configuration of the vertical driving unit 20.

MODIFICATION EXAMPLE

In the third embodiment described above, all the image signal output units 340 select the same image signal line. That is, all the image signal output units 340 simultaneously select the image signal line V1 or V2. In contrast, each image signal output unit 340 may select a different image signal line V1 or V2. This can improve the capability of repairing a break.

The image signal output unit 340 according to a modification example of the third embodiment of the present technology selects the image signal lines V1 and V2 arranged for each column for each column, and outputs an image signal transmitted by the selected image signal line to the analog-to-digital conversion unit 320. Specifically, the selection information retention unit 40 retains selection information for each column. The selection control unit 50 controls the image signal output unit 340 on the basis of the selection information for each column. Thus, even in the case where there are a plurality of columns in which a break has occurred in one of the image signal lines (V1 and V2) in the pixel array unit 10, a repair can be performed.

Thus, according to the modification example of the third embodiment of the present technology, the image signal output unit 340 is controlled for each column; thus, a repair can be made even in the case where a break occurs in different image signal lines (V1 and V2) in different columns, which can improve the capability of repairing a break.

As described above, according to the embodiments of the present technology, it is possible to prevent a decrease in yield due to a break in a signal line that transmits an image signal, while preventing a decrease in image quality.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

Effects described in the present description are just examples, the effects are not limited, and there may be other effects.

Additionally, the present technology may also be configured as below.

(1)

A solid-state image sensor including:

a photoelectric conversion unit configured to generate an image signal that is a signal corresponding to incident light;

a plurality of image signal lines configured to transmit the image signal; and a plurality of output control units configured to be connected to the respective plurality of image signal lines and output the generated image signal to the respective plurality of image signal lines.

(2)

The solid-state image sensor according to (1), further including a selection control unit configured to select one of the plurality of output control units on a basis of selection information that is information for selecting one of the plurality of image signal lines, and cause the selected output control unit to output the generated image signal.

(3)

The solid-state image sensor according to (2), further including a selection information retention unit configured to retain the selection information.

(4)

The solid-state image sensor according to any one of (1) to (3), further including an image signal output unit configured to select one of the plurality of image signal lines, and output an image signal transmitted by the selected image signal line.

(5)

The solid-state image sensor according to (4), in which an output control unit connected to the selected image signal line, among the plurality of output control units, outputs the generated image signal.

(6)

The solid-state image sensor according to (4), in which the plurality of output control units simultaneously output the generated image signal to the plurality of image signal lines.

(7)

The solid-state image sensor according to any one of (1) to (6), in which pixels each including the photoelectric conversion unit and the plurality of output control units are arranged in a matrix, the plurality of image signal lines are arranged for each column in the matrix, and the plurality of image signal lines arranged for each column are wired in common to pixels arranged in each column.

(8)

The solid-state image sensor according to (7), further including an image signal output unit configured to select one of the plurality of image signal lines arranged for each column for each column, and output an image signal transmitted by the selected image signal line, in which the plurality of output control units simultaneously output the generated image signal to the plurality of image signal lines.

(9)

An imaging device including:

a photoelectric conversion unit configured to generate an image signal that is a signal corresponding to incident light;

a plurality of image signal lines configured to transmit the image signal;

a plurality of output control units configured to be connected to the respective plurality of image signal lines and output the generated image signal to the respective plurality of image signal lines; and a processing circuit configured to process the transmitted image signal.

REFERENCE SIGNS LIST

1 imaging device
10 pixel array unit
20 vertical driving unit
30 horizontal driving unit
40 selection information retention unit
50 selection control unit
100 pixel
101 control signal line
102 image signal line
110 photoelectric conversion unit
111 photoelectric conversion element
112 to 114 MOS transistor
115 charge retention unit
121, 122 output control unit
210 vertical driving control unit
220 row selection unit
230 row selection signal output control unit
240 row switching unit
310 constant-current power supply
320 analog-to-digital conversion unit
330 conversion control unit
340 image signal output unit

The invention claimed is:

1. A solid-state image sensor, comprising:
a photoelectric conversion circuit configured to generate an image signal, wherein the image signal corresponds to incident light incident on the photoelectric conversion circuit;
a plurality of image signal lines;
a plurality of output control units, wherein
each output control unit of the plurality of output control units is connected to a respective image signal line of the plurality of image signal lines
a selection information retention unit configured to retain selection information, wherein the selection information is for selection of one image signal line of the plurality of image signal lines; and
a selection control unit configured to select a first output control unit of the plurality of output control units based on the selection information retained in the selection information retention unit, wherein
the first output control unit is configured to output the generated image signal to a first image signal line of the plurality of image signal lines,
the first image signal line is connected to the first output control unit, and
the first image signal line is configured to transmit the generated image signal received from the first output control unit.

2. The solid-state image sensor according to claim 1, further comprising an image signal output unit configured to:
select a second image signal line of the plurality of image signal lines, wherein the second image signal line is configured to transmit the generated image signal; and
output the generated image signal transmitted by the selected second image signal line.

3. The solid-state image sensor according to claim 2, wherein
a second output control unit of the plurality of output control units is connected to the selected second image signal line, and
the second output control unit is configured to output the generated image signal to the second image signal line.

4. The solid-state image sensor according to claim 2, wherein the plurality of output control units is configured to concurrently output the generated image signal to the plurality of image signal lines.

5. The solid-state image sensor according to claim 1, further comprising a plurality of pixels each including the photoelectric conversion circuit and the plurality of output control units, wherein
the plurality of pixels is in a matrix,
the plurality of image signal lines is for each column in the matrix, and
the plurality of image signal lines is wired in common to the plurality of pixels in each column of the matrix.

6. The solid-state image sensor according to claim 5, further comprising an image signal output unit configured to:
select a second image signal line of the plurality of image signal lines, wherein the second image signal line is configured to transmit the generated image signal; and
output the generated image signal transmitted by the selected second image signal line,
wherein the plurality of output control units is configured to concurrently output the generated image signal to the plurality of image signal lines.

7. An imaging device, comprising:
a photoelectric conversion circuit configured to generate an image signal, wherein the image signal corresponds to incident light incident on the photoelectric conversion circuit;
a plurality of image signal lines;
a plurality of output control units, wherein
each output control unit of the plurality of output control units is connected to a respective image signal line of the plurality of image signal lines;
a selection information retention unit configured to retain selection information, wherein the selection information is for selection of one image signal line of the plurality of image signal lines;
a selection control unit configured to select an output control unit of the plurality of output control units based on the selection information retained in the selection information retention unit, wherein
the output control unit is configured to output the generated image signal to an image signal line of the plurality of image signal lines,
the image signal line is connected to the output control unit, and
the image signal line is configured to transmit the generated image signal received from the output control unit; and
a processing circuit configured to process the transmitted image signal.

8. A solid-state image sensor, comprising:
a photoelectric conversion circuit configured to generate an image signal, wherein the image signal corresponds to incident light incident on the photoelectric conversion circuit;
a plurality of image signal lines;
a plurality of output control units, wherein
each output control unit of the plurality of output control units is connected to a respective image signal line of the plurality of image signal lines, and
the plurality of output control units is configured to concurrently output the generated image signal to the plurality of image signal lines; and
an image signal output unit configured to:
select one image signal line of the plurality of image signal lines, wherein the selected image signal line is configured to transmit the generated image signal received from a corresponding output control unit of the plurality of output control units; and
output the image signal transmitted by the selected image signal line.

9. A solid-state image sensor, comprising:
a plurality of pixels each including a photoelectric conversion circuit, wherein
the photoelectric conversion circuit is configured to generate an image signal,
the image signal corresponds to incident light incident on the photoelectric conversion circuit, and
the plurality of pixels is in a matrix;
a plurality of image signal lines for each column in the matrix, wherein the plurality of image signal lines is wired in common to the plurality of pixels in each column of the matrix;
a plurality of output control units, wherein
each output control unit of the plurality of output control units is connected to a respective image signal line of the plurality of image signal lines, and
the plurality of output control units is configured to concurrently output the generated image signal to the plurality of image signal lines; and an image signal output unit configured to:
  select one image signal line of the plurality of image signal lines, wherein the selected image signal line is configured to transmit the generated image signal received from a corresponding output control unit of the plurality of output control units; and
  output the generated image signal transmitted by the selected image signal line.

\* \* \* \* \*